(12) United States Patent
Lee

(10) Patent No.: US 6,588,939 B2
(45) Date of Patent: Jul. 8, 2003

(54) COUPLER FOR OPTICAL FIBER CABLES

(75) Inventor: Hsin Lee, Issaquah, WA (US)

(73) Assignee: Fiberon Technologies, Inc., Issaquah, WA (US)

( * ) Notice: Subject to any disclaimer, the term of this patent is extended or adjusted under 35 U.S.C. 154(b) by 0 days.

(21) Appl. No.: 09/947,315

(22) Filed: Sep. 5, 2001

(65) Prior Publication Data

US 2003/0044122 A1 Mar. 6, 2003

(51) Int. Cl.[7] .................................................. G02B 6/38
(52) U.S. Cl. ........................................................ 385/58
(58) Field of Search .............................. 385/50–53, 55, 385/56, 58, 70

(56) References Cited

U.S. PATENT DOCUMENTS

| | | | | | |
|---|---|---|---|---|---|
| 5,123,071 A | * | 6/1992 | Mulholland et al. | .......... | 385/53 |
| 5,293,581 A | * | 3/1994 | DiMarco | .................... | 385/76 |
| 5,574,812 A | * | 11/1996 | Beier et al. | .................... | 385/78 |

* cited by examiner

*Primary Examiner*—Khiem Nguyen
(74) *Attorney, Agent, or Firm*—Delbert J. Barnard

(57) ABSTRACT

A first clip (22, 70) is secured to the shank portions (24) of the plugs (18) at the ends of two optical cables (12, 16). A second clip (22, 70) is connected to the shanks (24) of the plugs (18) at the ends of two other optical cables (10, 14). The clips (22, 70) connect the plugs (18) together, making them be duplex plugs. The duplex plugs are insertable into socket openings formed in the ends of a connector housing (20).

10 Claims, 6 Drawing Sheets

COUPLER FOR OPTICAL FIBER CABLES

DESCRIPTION

1. Technical Field

The present invention relates to optical fiber technology. More particularly, it relates to the provision of structure that is adapted to connect together two optical fiber cables, with their optical fibers in alignment.

2. Background of the Invention

Optical fibers are used extensively in state-of-the-art systems for transmitting information rapidly from one location to another. In these systems, it is necessary to transfer an optical signal from one optical fiber cable to another. When two optical fibers meet, there is a connector component at the end of each fiber cable and there is a structure for holding the connector components in such a way that the end of a first optical fiber in a first cable is properly aligned with the end of an optical fiber in a second cable.

It is known to connect two fiber optical cables together by use of a tubular housing that has a socket at each of its ends. The connector components at the ends of two fiber optical cables include plugs that slip fit into a socket at its end of the tubular housing. When the plugs on the two cables are inserted into the two sockets and moved together, the plugs are gripped by the sockets and held in the sockets. The ends of the optical fibers substantially meet and are held substantially in coaxial alignment by the connector structure.

It is known to permanently connect (or more) plugs together, so that they can be moved into and out from their respective sockets at the same time. Two plugs that are connected together are referred to as a "duplex plug." This prior art system requires that the user have an inventory of both single plugs cables duplex cables and perhaps more if more than two cables are integrated.

There is a need for a connector system that allows single cables to be joined together, when desired, to provide a duplex (or multiplex) plug that is usable with any standard connector housing that is available on the market. An object of the present invention is to provide such a system.

BRIEF SUMMARY OF THE INVENTION

A primary object of the present invention is to provide a clip that is adapted to clip onto the single plug connector components at the ends of two or more single optical cables.

Optical fiber connectors of the present invention each include a tubular housing including at least two side-by-side sockets on at least one end. Each socket is adapted to receive and hold a plug on an end of a fiber optical cable. A plurality of fiber optical cables are provided. Each has an end portion that includes a plug sized to slip fit into a separate one of the sockets and a shank that is positioned inwardly of the cable from the plug. A clip is provided that is adapted to clip onto the shanks of said plurality of fiber optical cables and secure them together. When the shanks are secured together by the clip, the plugs project endwise outwardly of the clip in a position to into the sockets.

According to an aspect of the invention, the shanks and the clip have abutting surfaces that holds the clip against movement along the shanks when the clip is on the shank. In preferred form, one of each shank and the clip includes a socket and the other includes a pin that is sized to fit into the socket. The pin and socket provide the abutting surfaces.

Another aspect of the invention is to provide one of each shank and the clip with a longitudinal rib and the other with a longitudinal slot sized and shaped to receive the rib. The rib is sized to fit into the slot and the rib and slot will properly position the clip onto the shank portions of the fiber optic cables.

A first embodiment of the clip has first, second and third sidewalls. Each sidewall has first and second edges. The first edges of the first and second sidewalls are connected to the first and second edges of the third sidewall. The second edges of the first and second sidewalls are spaced apart, defining a space between them, and the sockets are in the space. This clip may be in the nature of a U-shaped clamp. The first and second walls are spreadable apart a small amount during the insertion of the plugs into the sockets. They store sufficient spring energy that when the plugs are within the sockets, the first and second sidewalls move back to their original positions.

A second embodiment of the clip has first, second and third outer sidewalls and at least one inner wall. The walls each have first and second edges. The first edges of the first and second outer sidewalls are connected to the first and second edges of the third sidewall. This clip may be in the nature of a M-shaped clamp. The first edge of the inner wall is connected to an intermediate portion of the third sidewall. The second edge of the first outer sidewall is spaced from a second edge of an inner wall. The second edge of the second outer sidewall is spaced from a second edge of an inner wall. This construction provides a socket on each side of each inner wall. The sides of the clip opposite the third outer wall are open between the second edges of the first and second outer sidewalls and the inner walls.

Other objects, advantages and features of the invention will become apparent from the description of the best modes set forth below, from the drawings, from the claims and from the principles that are embodied in the specific structures that are illustrated and described.

BRIEF DESCRIPTION OF THE SEVERAL VIEWS OF THE DRAWING

In the drawings, like reference numerals and letters are used to designate like parts throughout the several views of the drawing, and.

DETAILED DESCRIPTION OF THE INVENTION

Figure 1:
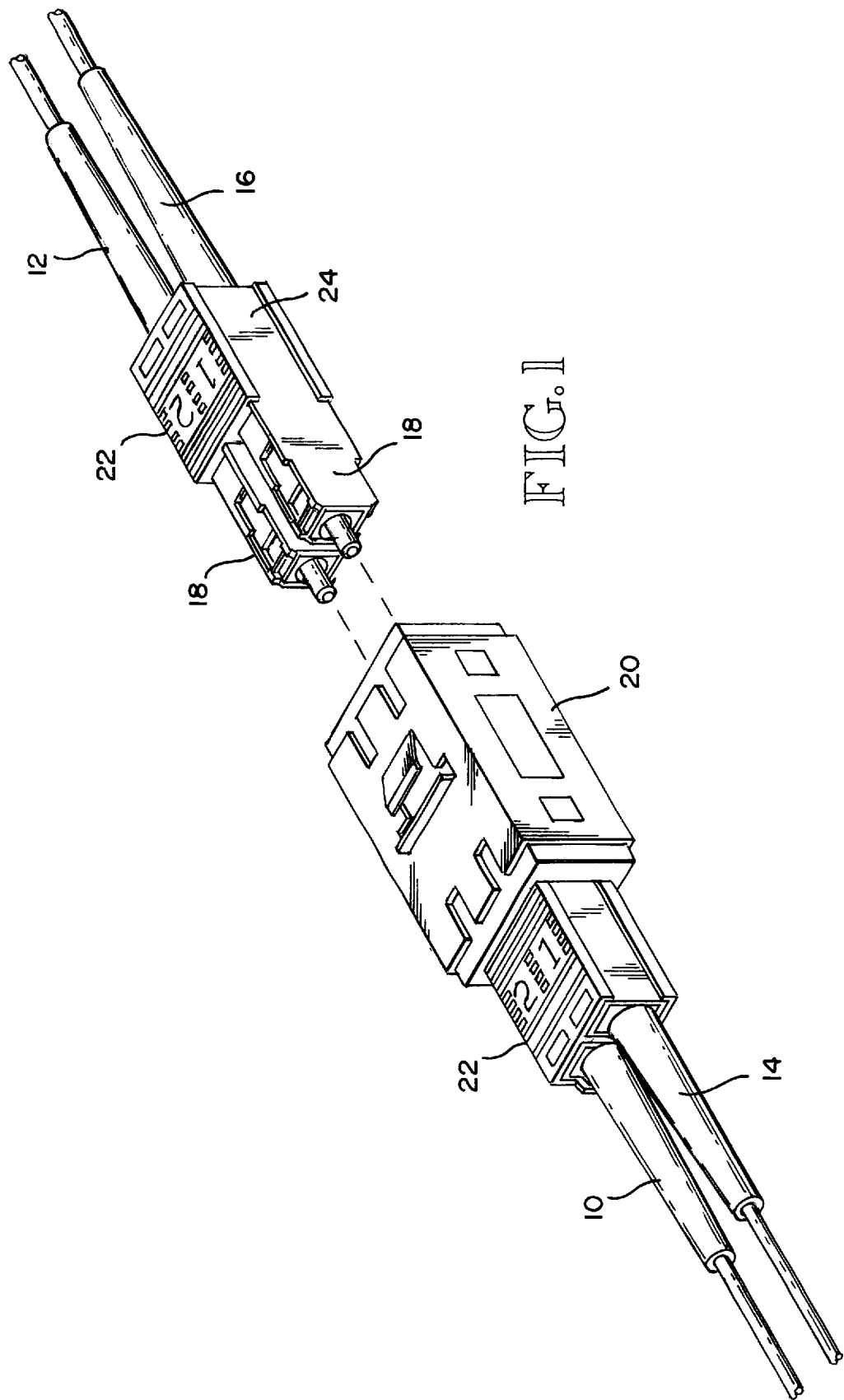
FIG. 1 is an exploded pictorial view of an optical fiber connector embodying the present invention, such view showing the confronting ends of two pairs of single optical fiber cables, each provided with a clip that connects the two cables of each pair together, so as to provide a duplex plug, such view showing one of the duplex plugs inserted into one end of a tubular connector housing, and the other duplex plug spaced outwardly from the opposite end of the housing.

Referring first to FIG. 1, a coupler or connection structure is shown for operatively connecting fiber optic cable section 10 to cable section 12 and for connecting cable section 14 to cable section 16. The cable sections 10, 12, 14, 16 are of identical construction. Each has a plug 18 at its end. The coupler also includes a tubular housing 20 having at least two sockets at each of its ends. In this embodiment, cable sections 10, 14 are connected together by a first clip 22. Cable sections 12, 16 are connected together by a second clip 22. The clips 22 are adapted to fit onto and secure together the shanks 24 that are spaced inwardly of the cables 10, 12, 14, 16 from the plugs 18. When a clip 22 is secured to the shanks 24 of two plugs 18, it secures the two plugs together so that they can be handled as one. They become a duplex cable. The plugs 18 project outwardly from the clip 22 and are insertable into the sockets in the housing 20 just as they would be individually insertable into the sockets if they were not held together by the clip 22.

The housing 20 need not be explained in any detail other than to say that it has two or more sockets at each of its ends. Each socket is adapted to receive and hold a plug 18. When the plugs 18 are in the sockets, the end of an optical fiber in cable 10 will be in proper alignment with the end of an optical fiber in cable 12. Also, the end of an optical fiber in cable 14 will be properly positioned with respect to the end of an optical fiber in cable 16. As is known in the art, the sockets are constructed to frictionally grip and hold the plugs 18 when the plugs 18 are in the sockets.

Figure 2:
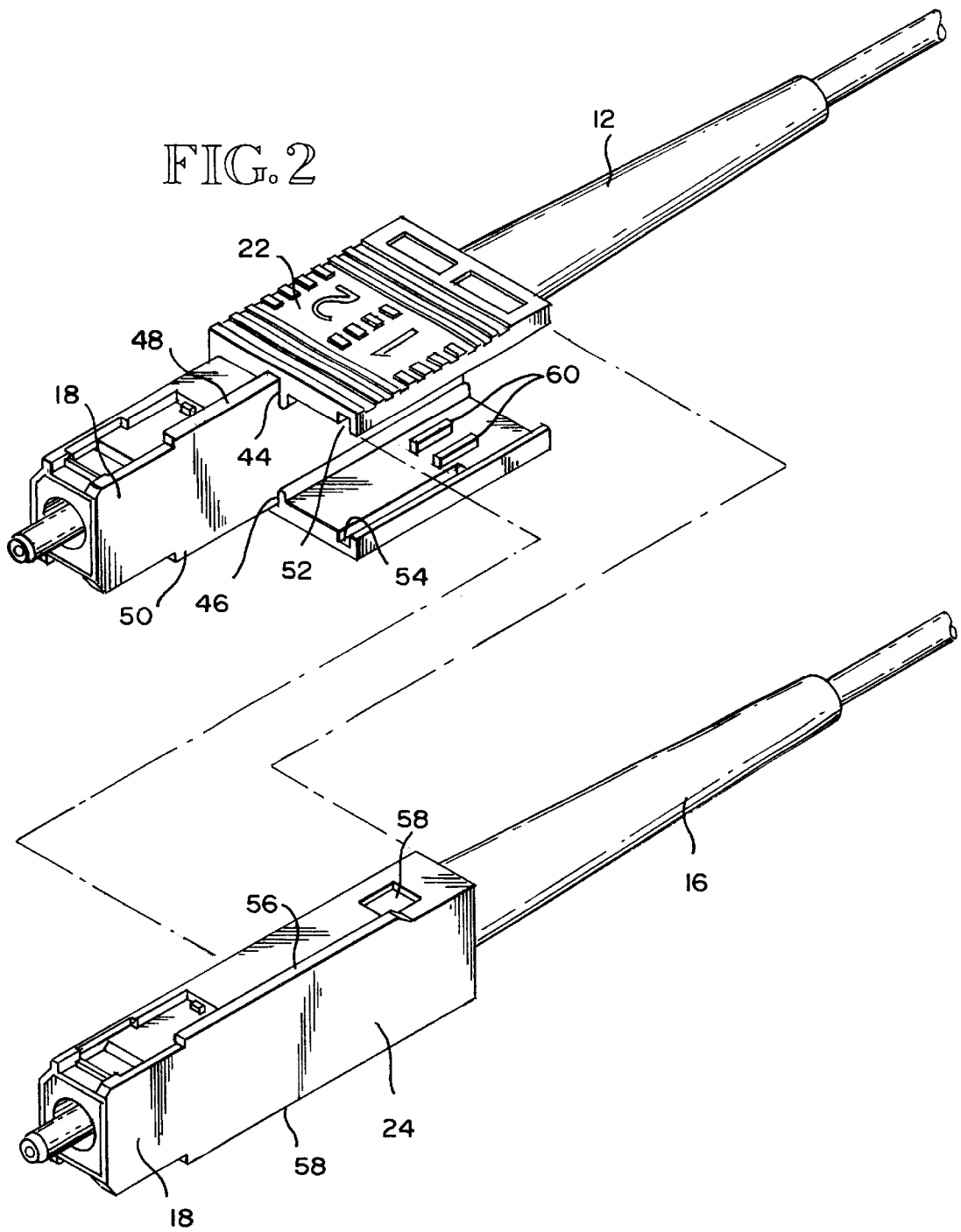
FIG. 2 is an exploded pictorial view of the two cable ends and clip that together provide a duplex plug, such view showing the clip installed on one of the plugs and showing the other plug spaced outwardly from its position within the clip.
Figure 3:
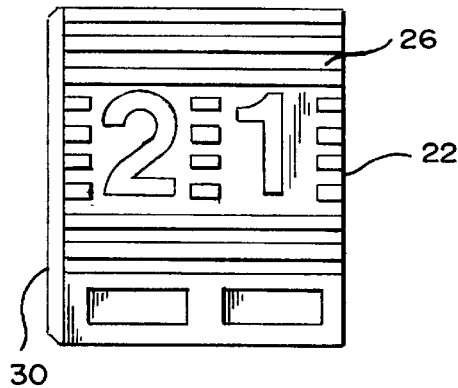
FIG. 3 is a top plan view of the clip shown in FIG. 2.
Figure 4:
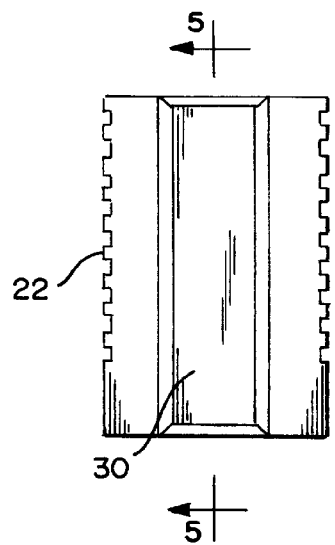
FIG. 4 is a view taken looking towards the third sidewall of the clip.
Figure 5:
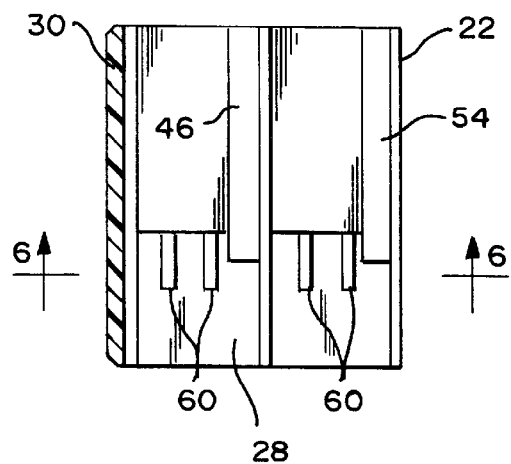
FIG. 5 is a longitudinal sectional view taken substantially along line 5—5 of FIG. 4.
Figure 6:
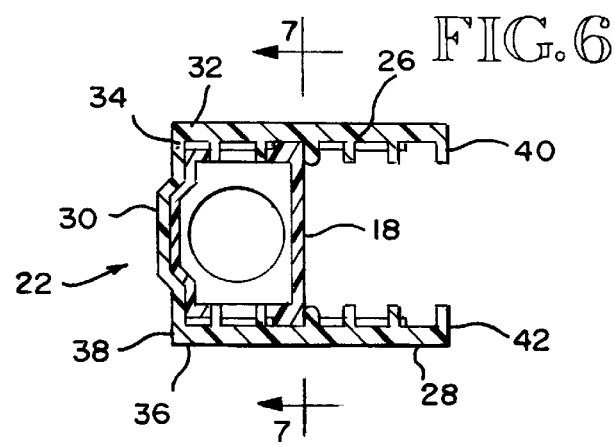
FIG. 6 is a cross sectional view taken substantially along 6—6 of FIG. 5.
Figure 7:
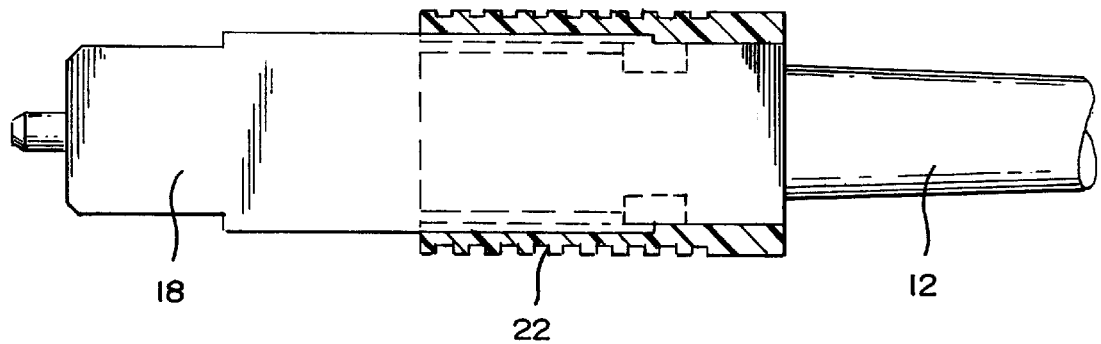
FIG. 7 is a longitudinal sectional view taken substantially along line 7—7 of FIG. 6.

FIGS. 1–8 show a first embodiment of the clip 22. It includes first, second and third sidewalls 26, 28, 30. Each sidewall 26, 28, 30 has first and second edges. The first edge 32 of sidewall 26 is connected to the first edge 34 of sidewall 30. The first edge 36 of sidewall 28 is connected to the second edge 38 of sidewall 30. The second edges 40, 42 of sidewalls 26, 28 are spaced apart, as shown in FIG. 6. The interior of the clip 22 includes longitudinal slots 44, 46 for receiving longitudinal ribs 48, 50 that are apart of the plug 18 for cable 12. Clip 22 also includes longitudinal slots 52, 54 for receiving longitudinal ribs 56, 58 on the plug 18 for the cable 16. Each shank 24 is in the nature of a housing having opposed walls that include socket openings 58. These socket openings are sized to receive plugs or pins 60 that are formed on the inside of the rear portions of the clips 22. As can be seen from FIG. 2, the plug 18 for cable 16 may be repositioned to place it in alignment with the rear opening in the clip 22. The ribs 56, 58 are placed into the grooves 52, 54 and then the plug is moved relatively into the clip 22. It will move forwardly until the pins 60 snap into a socket opening 58. When this happens, the clip 22 will be connected to the shank 24. When two plugs 18 are in the clip 22, the two plugs 18 will be secured together so that they can be inserted together into the tubular housing 20 and can be removed together from the housing 20. When the ribs 48, 50 are within the grooves 44, 46 and the ribs 56, 58 are in the grooves 52, 54, the socket openings in the clip 22 rather snugly engage the cross section of the shanks 24. This is best shown by FIGS. 2 and 6.

Preferably, the clip is provided with numbers "1" and "2" so that there will be a proper connection of cable 10 to cable 12 and cable 14 to cable 16. Also, the presence of the ribs 48, 50 and 56, 58 and the grooves 44, 46 and 52, 54 prevent wrongful insertion of the cables 12, 16, for example, in their clip 22.

Figure 8:
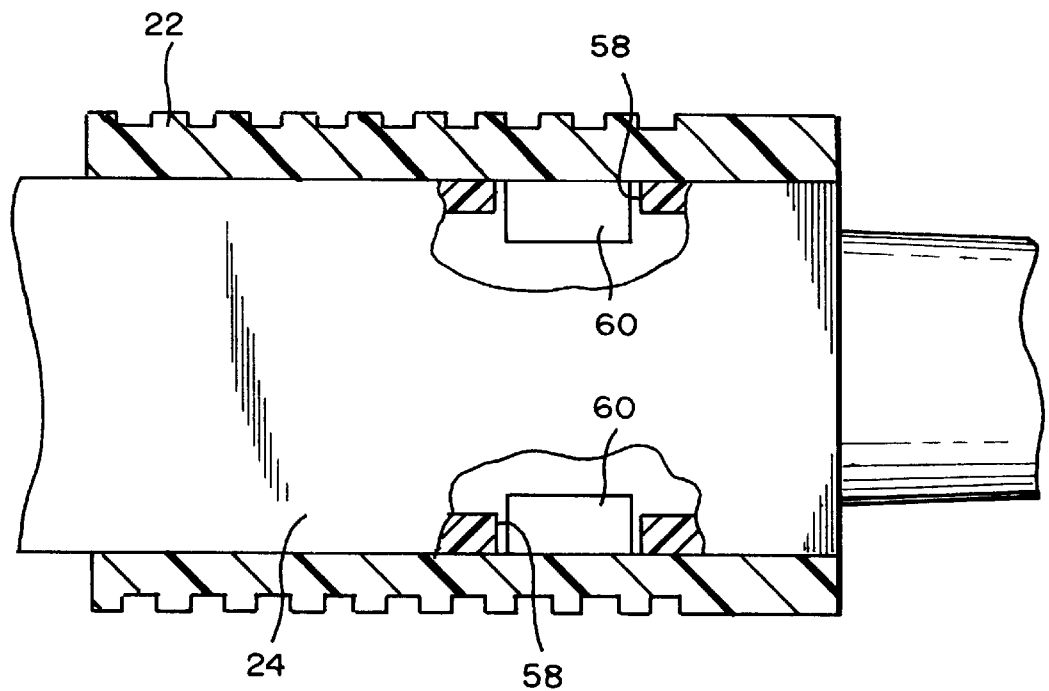
FIG. 8 is an enlarged scale longitudinal sectional view with portions of the clip shank cut away to show pins that are on the clip positioned into sockets that are formed in the shank.
Figure 9:
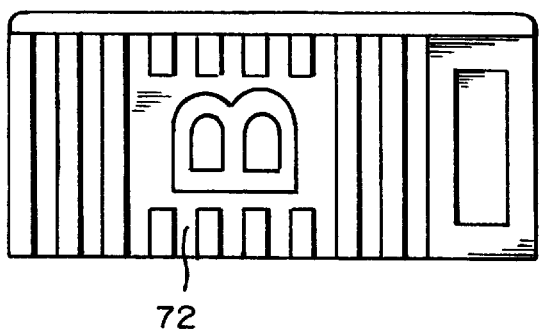
FIG. 9 is a view looking towards a first side of a second embodiment of the clip.
Figure 10:
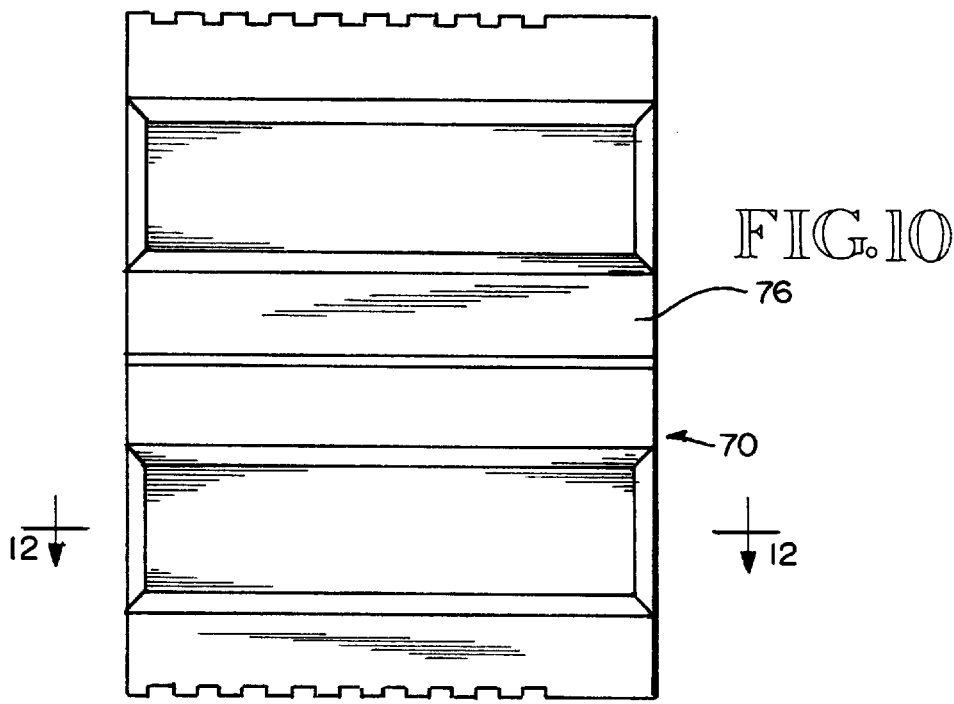
FIG. 10 is a view looking towards the third side of the clip shown by FIG. 9.
Figure 11:
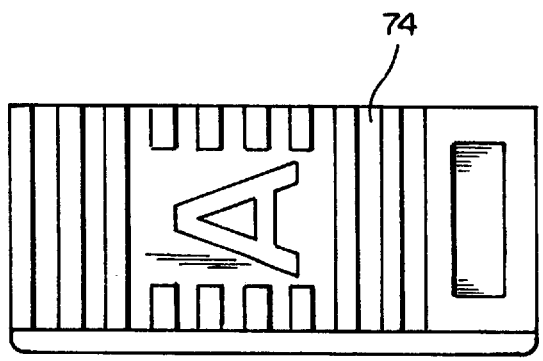
FIG. 11 is a view looking towards the second side of the clip shown by FIGS. 9 and 10.

FIG. 8 shows the pin 60 within the sockets 58. The clip 22 is in the nature of a C-shaped clamp. The sidewalls 26, 28 can be spread apart a sufficient amount to remove the pins 60 from the sockets 58 if it is desirable to remove the clip 22 from the plugs 18.

FIGS. 9–15 show a second embodiment of the clip which is designated 70. Clip 70 has first, second and third outer sidewalls 72, 74, 76 and one inner wall 78. Each wall 72, 74, 76, 78 has two edges. The first edge 80 of wall 72 is connected to the first edge 82 of wall 76. The first edge 84 of wall 74 is connected to the second edge 86 of wall 76. The first edge 88 of inner wall 78 is connected to an intermediate part of the wall 76. The second edges 90, 92, 94 of the walls 72, 74, 78 are spaced from the wall 76. Second edge 90 is spaced laterally (as pictured in FIG. 12) from second edge 94. Second edge 92 is spaced laterally from second edge 94. The first clip 22 is in the nature of a substantially U-shaped spring clamp. The second clip 70 is in the nature of a substantially M-shaped spring clamp. Outer sidewall 72 can be sprung away from inner wall 78 and outer sidewall 74 can also be sprung away from inner wall 78.

Figure 12:
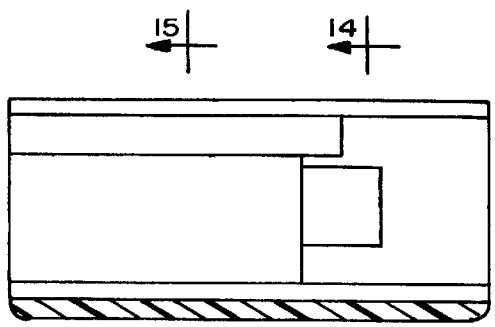
FIG. 12 is a sectional view taken substantially along line 12—12 of FIG. 10.
Figure 13:
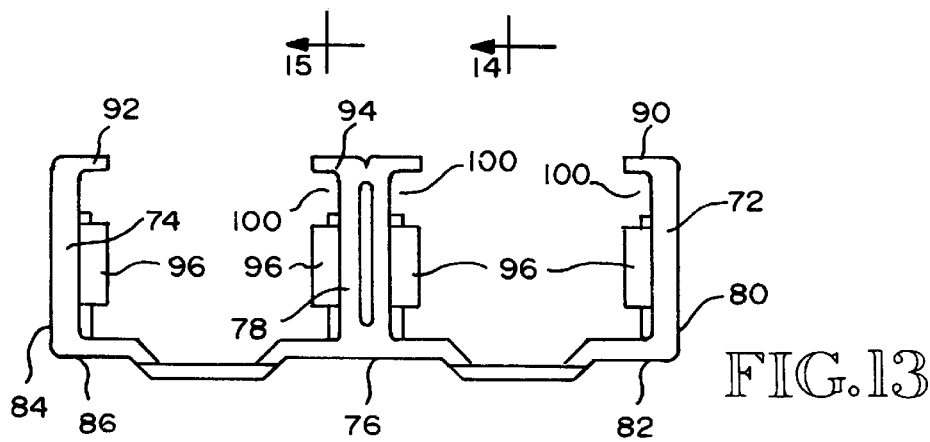
FIG. 13 is an end view looking towards one end of the clip shown by FIGS. 9–12.
Figure 14:
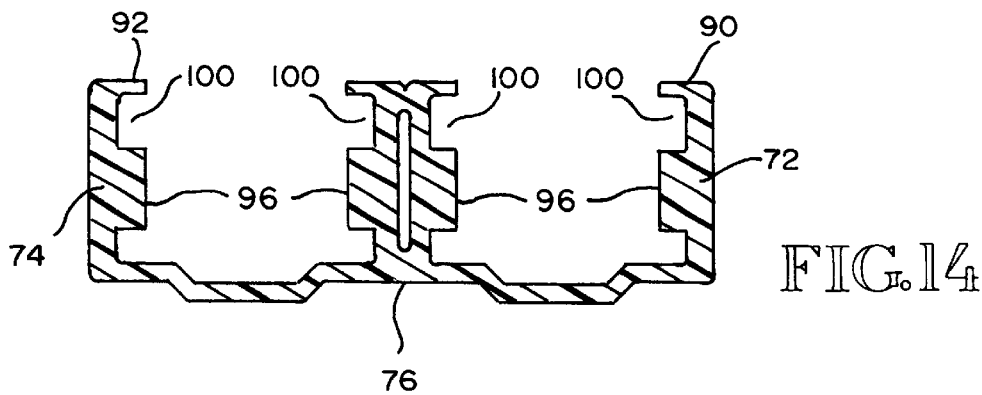
FIG. 14 is a sectional view taken substantially along line 14—14 of FIG. 12.
Figure 15:
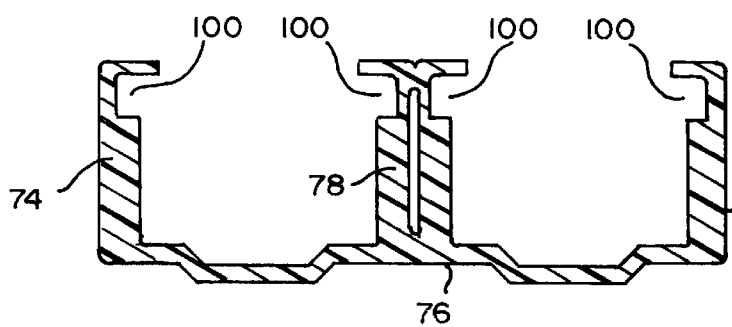
FIG. 15 is a sectional view taken substantially along line 15—15 of FIG. 12.

The walls 72, 74, 78 are provided with pins 96 that are sized to be received within the socket openings 58 in the shanks 24 of the plugs 18. FIG. 12 presents an end view of the clip 70 and FIGS. 13 and 14 present two sectional views at different locations. These views clearly show the shape and construction of the sockets that are formed in the clip 70. These sockets include slots 100 for the ribs 48, 50 and 56, 58. In the first embodiment, when the plugs 18 are within the clip 22, the sides of the plugs that include the ribs 48, 50 and 56, 58 are laterally spaced apart and are parallel to each other. In the second embodiment 70, these same sides of the plugs 18 are in a substantially coplanar parallelism. Clip 70 is also constructed so that only proper insertion of the plugs 18 can occur. The sidewalls 72, 74 of the clip 70 are provided with indicia, e.g. "A" and "B", which will serve to guide the movement of the duplex plug into and out from the housing 20.

The illustrated embodiments are only examples of the present invention and, therefore, are non-limitive. It is to be understood that many changes in the particular structure, materials and features of the invention may be made without departing from the spirit and scope of the invention. For example, the clips may have four sides and be constructed to snap fit onto the shanks. One sidewall of the clip can include a lug that is snap fittable into a socket formed in the shank. The lug may be at the free end of a three-sided leaf spring tab. Also, the clips may be constructed to connect more than two end plugs 18 together. For example, two more walls like walls 26, 28 can be made to extend outwardly from the wall 30 but in the opposite direction. This construction would place a substantially U-shaped clamp on each side of the wall 30. Also, one or more additional sockets can be added onto the clip 70. For example, the wall 76 may be extended to the left, as viewed in FIG. 12, and the outer wall 72 may then be moved outwardly and connected to the extension, and another inner wall 18 may be positioned to the left of the first inner wall 78. Therefore, it is my intention that my patent rights not be limited by the particular embodiments illustrated and described herein, but rather they are to be determined by the following claims, interpreted according to accepted doctrines of claim interpretation, including use of the doctrine of equivalents and reversal of parts.

What is claimed is:

1. An optical fiber connector, comprising:
    a tubular housing including at least two side-by-side sockets, each adapted to receive and hold a plug on an end of a fiber optical cable;
    a fiber optical cable for each said socket, each having an end portion that includes a plug sized to slip fit into a separate one of said sockets, and a shank that is positioned inwardly of the cable from said plug;
    each said shank including a longitudinal rib;
    a clip sized, shaped and adapted to clip onto the shanks of said fiber optical cables and secure them together, with their plugs projecting endwise from the clip in a position to fit within the sockets; and
    said clip includes longitudinal slots sized, shaped and positioned to receive the longitudinal ribs on the shanks, so that each rib will fit into a slot and the ribs and the slots will position the clip onto the end portions of the fiber optical cables.

2. The optical fiber connector of claim 1, wherein the shanks and the clip have abutting surfaces that hold the clip against movement along the shank when the clip is on the shank.

3. The optical fiber connector of claim 2, wherein one of each shank and the clip includes a socket and the other includes a pin that is sized to fit into the socket, said pin and socket providing said abutting surfaces.

4. The optical fiber connector of claim 1, wherein the clip has first, second and third sidewalls, each having first and second edges, wherein the first edges of the first and second sidewalls are connected to the first and second edges of the third sidewall, the second edges of the first and second sidewalls are spaced apart, defining a space between them, and wherein said sockets are in said space.

5. The optical fiber connector of claim 1, wherein each clip has first, second and third outer sidewalls and at least one inner wall, said walls each having first and second edges, wherein the first edges of the first and second outer sidewalls are connected to the first and second edges of the third sidewall, and the first edge of the inner wall is connected to an intermediate portion of the third sidewall, and the second edge of the first outer sidewall is spaced from a second edge of an inner wall and the second edge of the second outer sidewall is based from a second edge of an inner wall, and wherein there is a said socket on each side of each inner wall.

6. An optical fiber connector, comprising:
    a tubular housing including two ends and at least two side-by-side sockets at each end, each said socket being adapted to receive and hold a plug that is at an end of a fiber optical cable;
    a fiber optical cable for each said socket, each said cable having an end portion that includes a plug that is sized to slip fit into a separate one of said sockets and a shank that is positioned inwardly of the cable from said plug;
    each said shank including a longitudinal rib;
    a first clip sized, shaped and adapted to clip onto the shanks of a first plurality of said fiber optical cables and secure them together, with their plugs projecting endwise from the clips and positioned to fit into the sockets at one end of the tubular housing;
    a second clip sized, shaped and adapted to clip onto the shanks of a second plurality of said fiber optical cables and secure them together, with their plugs projecting endwise from the clips and position to fit into the sockets at the second end of the tubular housing; and
    each said socket including a longitudinal slot sized, shaped and positioned to receive the longitudinal ribs on the shank of its cable, so that said ribs will fit into said slots and the ribs and the slots will position the clips onto the end portions of the fiber optical cables.

7. The optical fiber connector of claim 6, wherein the shanks and the clips have abutting surfaces that hold the clips against movement along the shanks when the clips are on the shanks.

8. The optical fiber connector of claim 7, wherein one of each shank and its clip includes a socket and the other includes a pin that is sized to fit into the socket, said pin and socket providing said abutting surfaces.

9. The optical fiber connector of claim 6, wherein each clip has first, second and third sidewalls, wherein the first edges of the first and second sidewalls have first edges that are connected to the first and second edges of the third sidewall, wherein the second edges of the first and second sidewalls are spaced apart, defining a space between them, and wherein said sockets are in said space.

10. The optical fiber connector of claim 6, wherein each clip has first, second and third outer sidewalls and at least one inner wall, said walls each having first and second edges, wherein the first edges of the first and second outer sidewalls are connected to the first and second edges of the third sidewall, and the first edge of the inner wall is connected to an intermediate portion of the third sidewall, and the second edge of the first outer sidewall is spaced from a second edge of an inner wall and the second edge of the second outer sidewall is based from a second edge of an inner wall, and wherein there is a said socket on each side of each inner wall.

* * * * *